(12) United States Patent
Li et al.

(10) Patent No.: US 10,055,820 B2
(45) Date of Patent: Aug. 21, 2018

(54) IMAGE DE-NOISING METHOD AND APPARATUS THEREOF

(71) Applicant: REALTEK SEMICONDUCTOR CORP., Hsinchu (TW)

(72) Inventors: Tsung-Hsuan Li, Taichung (TW); Hao-Tien Chiang, Taipei (TW); Shih-Tse Chen, Hsinchu County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 37 days.

(21) Appl. No.: 15/439,357

(22) Filed: Feb. 22, 2017

(65) Prior Publication Data
US 2017/0256037 A1  Sep. 7, 2017

(30) Foreign Application Priority Data

Mar. 1, 2016  (TW) .............................. 105106108 A

(51) Int. Cl.
| | | |
|---|---|---|
| G06K 9/40 | (2006.01) | |
| G06T 5/00 | (2006.01) | |
| G06K 9/46 | (2006.01) | |
| G06K 9/62 | (2006.01) | |
| G06T 5/50 | (2006.01) | |

(52) U.S. Cl.
CPC ............ *G06T 5/002* (2013.01); *G06K 9/4661* (2013.01); *G06K 9/6276* (2013.01); *G06T 5/50* (2013.01); *G06T 2207/10016* (2013.01); *G06T 2207/20182* (2013.01); *G06T 2207/20216* (2013.01); *G06T 2207/20224* (2013.01)

(58) Field of Classification Search
USPC .......................................................... 382/275
See application file for complete search history.

(56) References Cited

U.S. PATENT DOCUMENTS

2008/0123740 A1  5/2008  Ye
2015/0373235 A1  12/2015  Chiang et al.

FOREIGN PATENT DOCUMENTS

| CN | 101355649 A | 1/2009 |
|---|---|---|
| EP | 2075755 A2 | 7/2009 |
| TW | 201601117 A | 1/2016 |
| WO | WO 2001035636 A1 | 5/2001 |

*Primary Examiner* — Jerome Grant, II
(74) *Attorney, Agent, or Firm* — Li & Cai Intellectual Property (USA) Office

(57) ABSTRACT

An image de-noising method and an apparatus thereof are disclosed, which includes categorizing a pixel in a current frame into a first low-frequency pixel having a first weight and a first high-frequency pixel having a second weight; categorizing a previous pixel corresponding to the position of the pixel in a previous frame into a second low-frequency pixel having a third weight and a second high-frequency pixel having a fourth weight; adjusting the first weight and the third weight and calculating the weighted sum of the first low-frequency pixel and the second low-frequency pixel, to generate low-frequency pixel data; adjusting the second weight and the fourth weight and calculating the weighted sum of the first high-frequency pixel and the second high-frequency pixel, to generate high-frequency pixel data; and calculating the sum of the low-frequency pixel data and the high-frequency pixel data, to output the de-noised pixel.

14 Claims, 7 Drawing Sheets

IMAGE DE-NOISING METHOD AND APPARATUS THEREOF

BACKGROUND

1. Technical Field

The present disclosure relates to an image de-noising method and an apparatus thereof, in particular, to an image de-noising method and an apparatus thereof in the time domain.

2. Description of Related Art

In the real-time digital image processing, a kind of image de-noising performed in the time domain decides the similarity between the previous frame and the current frame, to execute a suitable weighted average for achieving the effect of image de-noising. The biggest advantage is that this image de-noising method does not cause image blur and detail loss.

However, the image de-noising performed in the time domain easily causes ghosting artifacts or an unnatural image because the scene change is too great (i.e., the difference between the previous frame and the current frame is too great). To avoid this situation from occurring, the de-noising method must be adjusted in accordance with the lighting change and the scene change.

SUMMARY

Accordingly, exemplary embodiments of the present disclosure provide an image de-noising method and an apparatus thereof, which adaptively adjusts the weighted average in the time domain according to the scene change, to remove noise from each pixel of the current frame in sequence, and then output the de-noised pixel, thereby achieving a better effect of image de-noising.

An exemplary embodiment of the present disclosure provides an image de-noising method, which is adapted for an image de-noising apparatus. The image de-noising method is used for removing noise of a pixel in a current frame to output an output pixel. The image de-noising method includes the following steps. Step A: receiving the current frame, and categorizing the pixel in the current frame into a first low-frequency pixel and a first high-frequency pixel, wherein the first low-frequency pixel has a first weight and the first high-frequency pixel has a second weight; Step B: categorizing a previous pixel corresponding to the position of the pixel in a previous frame into a second low-frequency pixel and a second high-frequency pixel, wherein the second low-frequency pixel has a third weight and the second high-frequency pixel has a fourth weight; Step C: adjusting the first weight and the third weight and calculating the weighted sum of the first low-frequency pixel and the second low-frequency pixel, to generate low-frequency pixel data, wherein the sum of the first weight and the third weight are one; Step D: adjusting the second weight and the fourth weight and calculating the weighted sum of the first high-frequency pixel and the second high-frequency pixel, to generate high-frequency pixel data, wherein the sum of the second weight and the fourth weight are one; and Step D: calculating the sum of the low-frequency pixel data and the high-frequency pixel data, to output the de-noised pixel.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
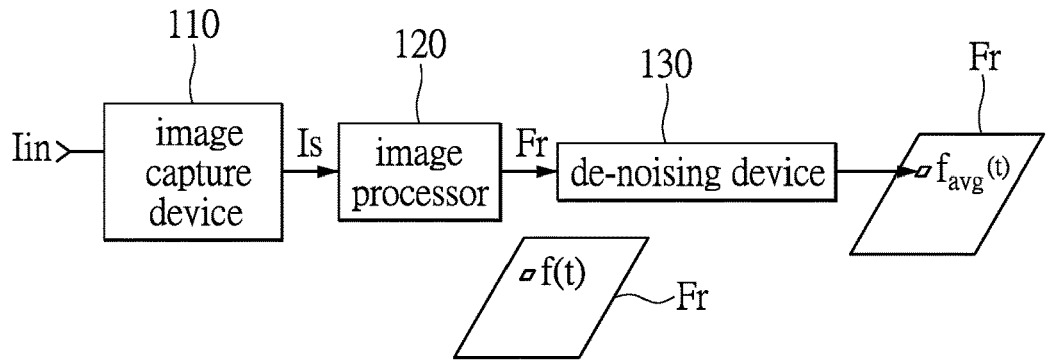
FIG. 1 shows a block diagram of an image de-noising apparatus according to an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

This embodiment provides an image de-noising method and an apparatus thereof, which categorize a pixel into a low-frequency pixel and a high-frequency pixel, and categorize a previous pixel corresponding to position of the pixel into another low-frequency pixel and another high-frequency pixel, to adaptively adjust the weight of the low-frequency pixel and the weight of the high-frequency pixel in the pixel and those in the previous pixel according to the scene change. When the scene change is less, the weight of the low-frequency pixel and the weight of the high-frequency pixel in the previous pixel are adjusted higher. When the scene change is more, the weight of the low-frequency pixel and the weight of the high-frequency pixel in the pixel are adjusted higher. Next, calculating the weighted sum (i.e., low-frequency pixel data) of the low-frequency pixel in the previous pixel and the pixel, calculating the weighted sum (i.e., high-frequency pixel data) of the high-frequency pixel in the previous pixel and the pixel, and then adding the low-frequency pixel data and the high-frequency pixel data to generate the de-noised output pixel. More specifically, the scene change suffers from the influence of lighting change, moving object, and pixel noise. As such, the image de-noising method and the apparatus thereof will calculate the scene change according to the aforementioned influence, to adaptively adjust each weight, thereby achieving a better effect of image de-noising. The image de-noising method and the apparatus thereof provided in the exemplary embodiment of the present disclosure will be described following.

Firstly, please refer to FIG. 1, which shows a block diagram of an image de-noising apparatus according to an exemplary embodiment of the present disclosure. As shown in FIG. 1, the image de-noising apparatus 100 is used for removing the noise of each pixel of the current frame in sequence, and then outputs the de-noised pixel. In the present disclosure, the image de-noising apparatus 100 can be smart phone, video recorder, tablet computer, notebook, or other image de-noising apparatus 100 needed to remove the noise, but is not limited thereto.

The image de-noising apparatus 100 includes an image capture device 110, an image processor 120, and a de-noising device 130. The image capture device 110 is used for capturing an image Iin, and transforms the image Iin into an image signal Is with a specific image format. More specifically, the image capture device 110 is used for capturing successive images. The image Iin is one of the successive images. The specific image format, for example, is RGB image format, YUV image format, or another image format, but is not limited hereto.

The image processor 120 is coupled to the image capture device 110. The image processor 120 receives the image signal Is and then transforms the image Is into a current frame Fr. Those skilled in the art know the implementation of the image capture device 110 transforming the image Iin into the image signal Is having the specific image format, and the image processor 120 transforming the image Is into the current frame Fr, and further descriptions are hereby omitted. For explanatory convenience, the YUV image format is taken as the specific image format for illustration.

The de-noising device 130 is coupled to the image processor 120 and executes the following steps, to remove the noise of each pixel of the current frame Fr in sequence and to output the de-noised pixel. For explanatory convenience, the following description is based on the example that the de-noising device 130 removes the noise of a pixel f(t) in the current frame Fr, and then outputs a de-noised output pixel $f_{avg}(t)$. Please refer to FIG. 2 in conjunction with FIG. 1. It is worth to note that the scene change (i.e., the difference between the previous frame and the current frame) will influence the effect of image de-noising, and the scene change will suffer from the influence of lighting change (i.e., the low-frequency portion in the pixel), moving object (i.e., the high-frequency portion of the pixel), and pixel noise (i.e., the high-frequency portion of the pixel). Therefore, the de-noising device 130 categorizes the pixel f(t) into the low-frequency portion and the high-frequency portion, and categorizes the previous pixel $f_{avg}(t-1)$ corresponding to position of the pixel f(t) in the previous frame Fr-1 into the low-frequency portion and the high-frequency portion, to adaptively adjust the weight of the low-frequency portion and the weight of the high-frequency portion in the pixel f(t) and that in the previous pixel $f_{avg}(t-1)$ according to the scene change, thereby removing the noise of the pixel f(t). The detailed steps will be described in the following paragraph.

Figure 3:
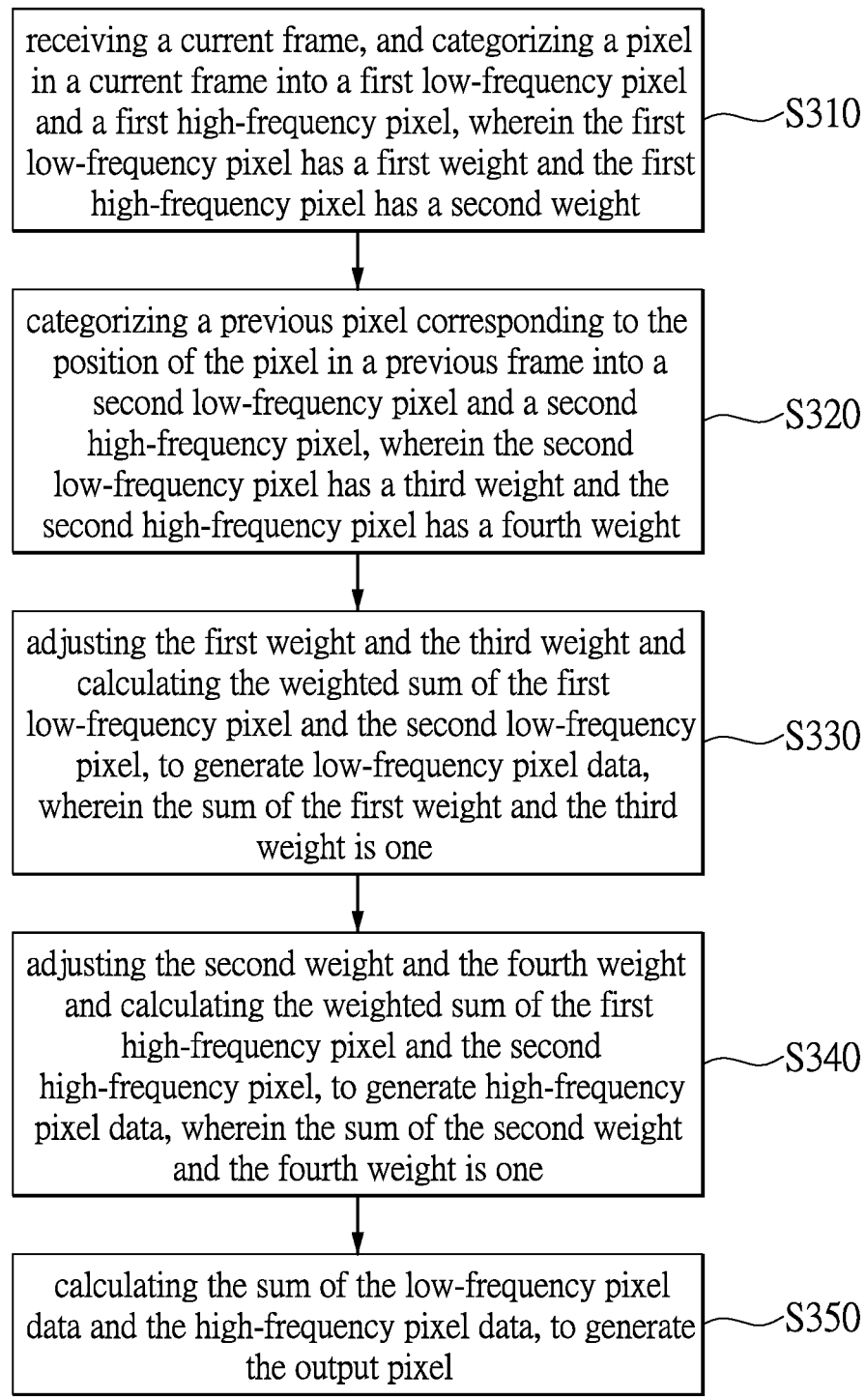
FIG. 3 shows a flowchart of an image de-noising method according to an exemplary embodiment of the present disclosure.

FIG. 3 shows a flowchart of an image de-noising method according to an exemplary embodiment of the present disclosure. Firstly, the de-noising device 130 receives the current frame Fr transmitted from the image processor 120, and categorizes the pixel f(t) of the current frame Fr into a first low-frequency pixel $f_L(t)$ and a first high-frequency pixel $f_H(t)$. The first low-frequency pixel $f_L(t)$ has a first weight and the first high-frequency pixel $f_H(t)$ has a second weight (step S310).

Figure 2:
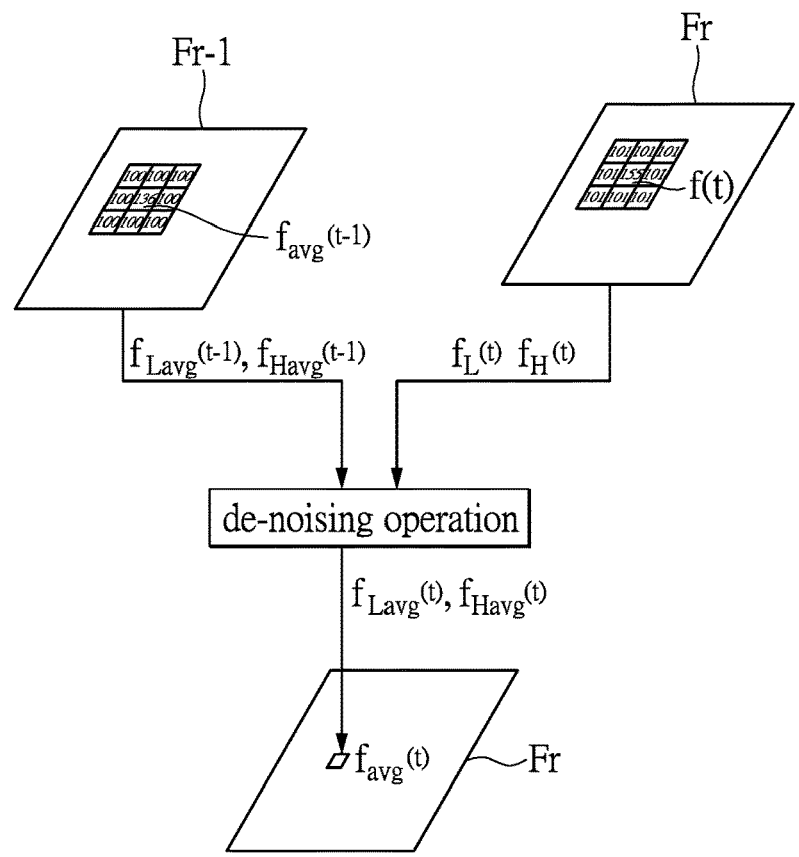
FIG. 2 shows a block diagram of executing a de-noising operation according to a pixel and a previous pixel corresponding to the position of the pixel for generating an output pixel.

In the present disclosure, the first low-frequency pixel $f_L(t)$ is generated by averaging the pixel f(t) and a plurality of adjacent pixels around the pixel f(t) in the current frame Fr. The first high-frequency pixel $f_H(t)$ is generated by subtracting first low-frequency pixel $f_L(t)$ from the pixel f(t). For example, as shown in FIG. 2, the pixel f(t) is 155 and the adjacent pixels around the pixel f(t) are 101. Therefore, the first low-frequency pixel $f_L(t)=(155+8*101)/9=107$, and the first high-frequency pixel $f_H(t)=155-107=48$. The first low-frequency pixel $f_L(t)$ and the first high-frequency pixel $f_H(t)$ can be calculated by other methods. The present disclosure is not limited thereto.

Next, the de-noising device 130 categorizes the previous frame $f_{avg}(t-1)$ corresponding to the position of the pixel f(t) in the previous frame Fr-1 into a second low-frequency pixel $f_{Lavg}(t-1)$ and a second high-frequency pixel $f_{Havg}(t-1)$. The second low-frequency pixel $f_{Lavg}(t-1)$ has a third weight and the second high-frequency pixel $f_{Havg}(t-1)$ has a fourth weight (step S320).

In the present disclosure, the second low-frequency pixel $f_{Lavg}(t-1)$ is generated by averaging the previous pixel $f_{avg}(t-1)$ and a plurality of adjacent pixels around the previous pixel $f_{avg}(t-1)$ in the previous frame Fr-1. The second high-frequency pixel $f_{Havg}(t-1)$ is generated by subtracting the second low-frequency pixel $f_{Lavg}(t-1)$ from the previous pixel $f_{avg}(t-1)$. For example, as shown in FIG. 2, the previous pixel $f_{avg}(t-1)$ is 136 and the adjacent pixels around the previous pixel $f_{avg}(t-1)$ is 100. Therefore, the second low-frequency pixel $f_{Lavg}(t-1)=(136+8*100)/9=104$, and the second high-frequency pixel $f_{Havg}(t-1)=136-104=32$. Similarly, the second low-frequency pixel $f_{Lavg}(t-1)$ and the second high-frequency pixel $f_{Havg}(t)$ can be calculated by other methods. The present disclosure is not limited thereto.

Next, the de-noising device 130 adjusts the first weight and the third weight, and calculates the weighted sum of the first low-frequency pixel $f_L(t)$ and the second low-frequency pixel $f_{Lavg}(t-1)$, to generate low-frequency pixel data $f_{Lavg}(t)$. The sum of the first weight and the third weight is 1 (step S330). The aforementioned low-frequency pixel data $f_{Lavg}(t)$ may be organized into the algorithm (1), as follows.

$$f_{Lavg}(t)=W_L \times f_L(t)+(1-W_L) \times f_{Lavg}(t-1) \quad \text{algorithm (1)}$$

$W_L$ is the first weight of the first low-frequency pixel $f_L(t)$, and $(1-W_L)$ is the third weight of the second low-frequency pixel $f_{Lavg}(t-1)$.

More specifically, the de-noising device 130 adjusts the first weight and the third weight according to the scene change (i.e., the difference between the previous frame and the current frame). When the scene change is greater, this indicates that the scene suffers greater change from the influence of moving objects. The de-noising device 130 increases the first weight $W_L$ of the first low-frequency pixel $f_L(t)$ and decreases the third weight $(1-W_L)$ of the second low-frequency pixel $f_{Lavg}(t-1)$, to acquire the higher value of the first t low-frequency pixel $f_L(t)$. Conversely, when the scene change is less, this indicates that the scene suffers greater change from the influence of pixel noise. The de-noising device 130 decreases the first weight $W_L$ of the first low-frequency pixel $f_L(t)$ and increases the third weight $(1-W_L)$ of the second low-frequency pixel $f_{Lavg}(t-1)$, to acquire the higher value of the second low-frequency pixel $f_{Lavg}(t-1)$. The detailed step of adjusting the first weight and the third weight will be described in the following paragraph.

Figure 4:
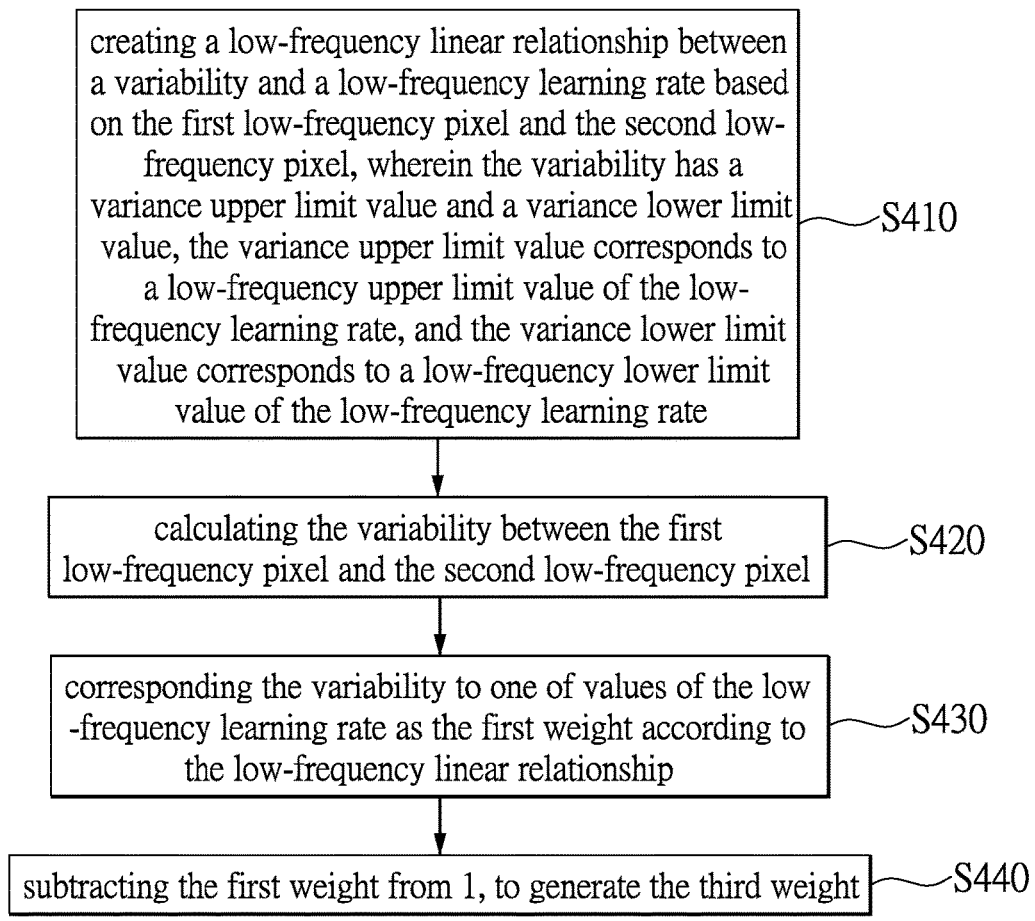
FIG. 4 shows a flowchart of adjusting a first weight and a third weight according to an exemplary embodiment of the present disclosure.
Figure 5A:
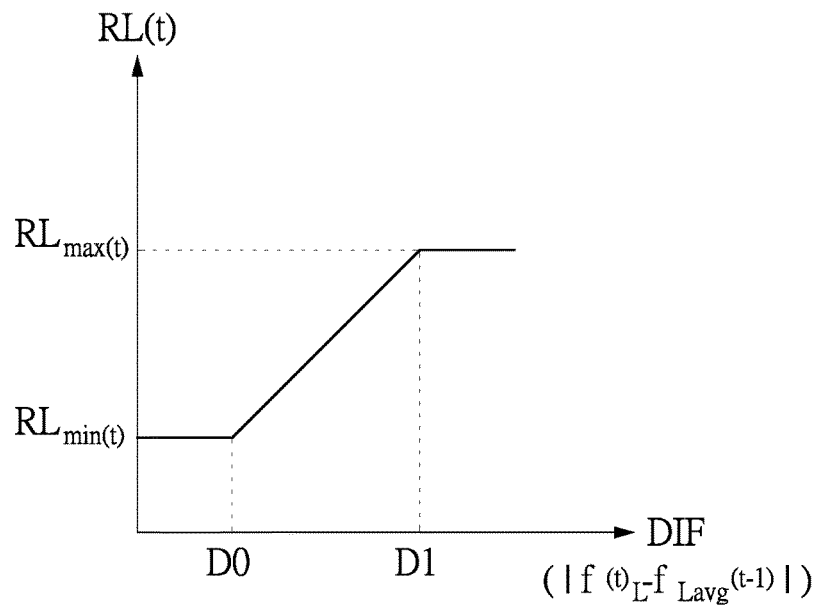
FIG. 5A shows a chart of a low-frequency linear relationship according to an exemplary embodiment of the present disclosure.
Figure 5B:
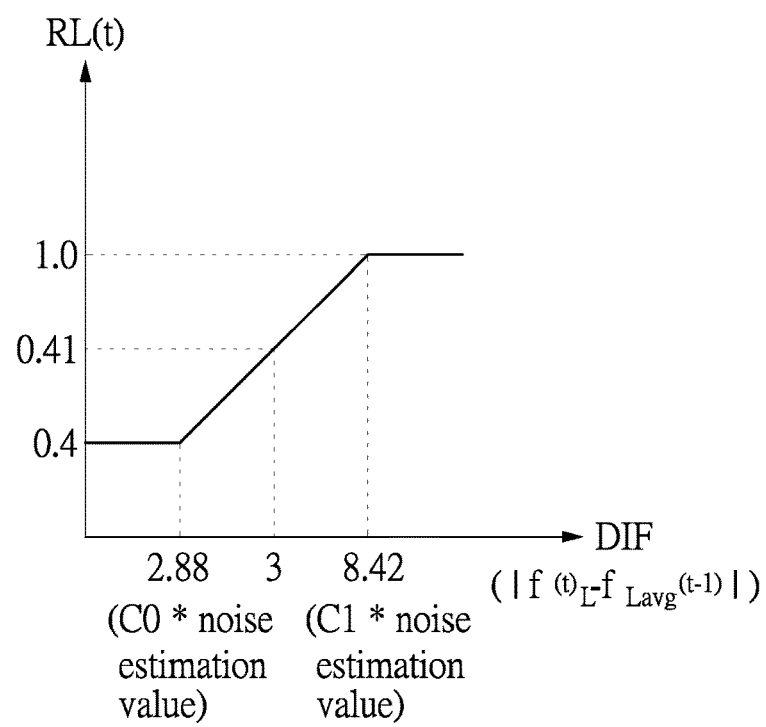
FIG. 5B shows a chart of a low-frequency linear relationship according to another exemplary embodiment of the present disclosure.

Please refer to FIGS. 4, 5A, and 5B. FIG. 4 shows a flowchart of adjusting a first weight and a third weight according to an exemplary embodiment of the present disclosure. Firstly, the de-noising device 130 creates a low-frequency linear relationship between a variability DIF and a low-frequency learning rate RL(t) based on the first low-frequency pixel $f_L(t)$ and the second low-frequency pixel $f_{Lavg}(t-1)$, as shown in FIG. 5A (step S410). The variability DIF has a variance upper limit value D1 and a variance lower limit value D0. The variance upper limit value D1 corresponds to a low-frequency upper limit value $R_{max}(t)$ of the low-frequency learning rate RL(t). The variance lower limit value D0 corresponds to a low-frequency lower limit value $RL_{min}(t)$ of the low-frequency learning rate RL(t). In the present disclosure, the low-frequency upper limit value $R_{max}(t)$ and the low-frequency lower limit value $RL_{min}(t)$ are configured to a constant, i.e., the low-frequency upper limit value $R_{max}(t)$ is set to 1.0 and the low-frequency lower limit value $RL_{min}(t)$ is set to 0.4, as shown in FIG. 5B. The low-frequency upper limit value $R_{max}(t)$ and the low-frequency lower limit value $RL_{min}(t)$ can be configured by the actual conditions, and should not be limited.

Figure 6:
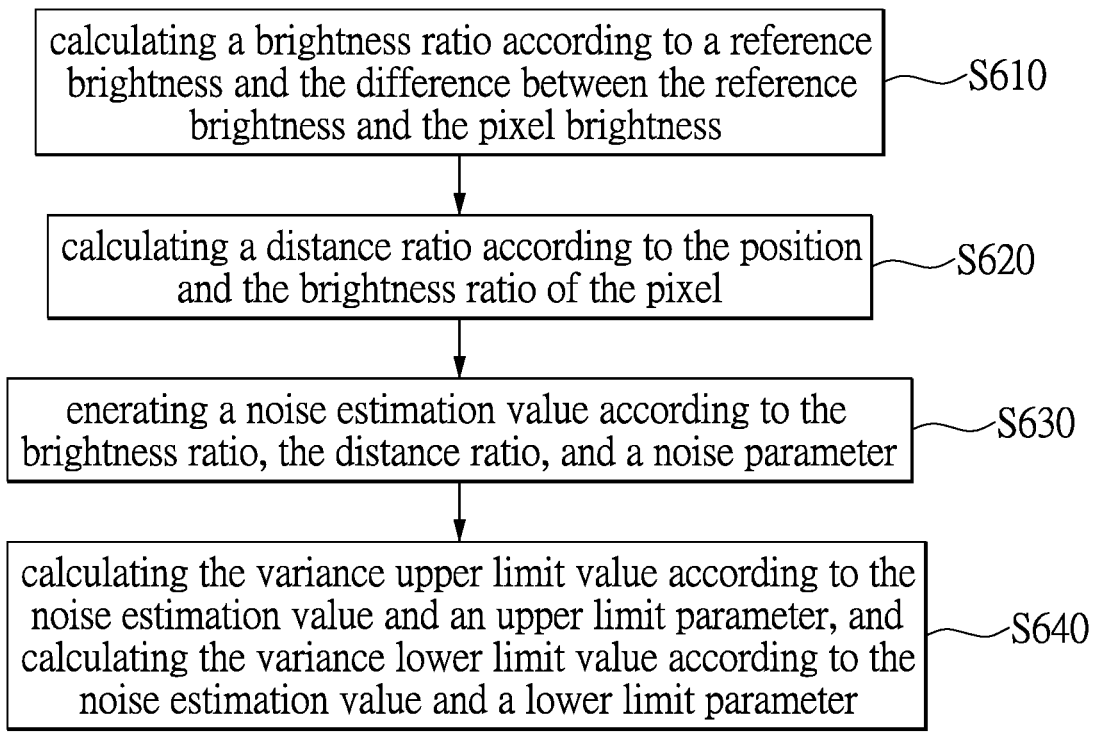
FIG. 6 shows a flowchart of creating a variance upper limit value and a variance lower limit value according to an exemplary embodiment of the present disclosure.

The variance upper limit value D1 and the variance lower limit value D0 are relative to a pixel brightness of the pixel f(t) corresponding to the current frame Fr and a position of the pixel f(t) located in the current frame Fr. More specifically, please refer to FIG. 6, which shows a flowchart of creating a variance upper limit value and a variance lower limit value according to an exemplary embodiment of the present disclosure. As shown in FIG. 6, firstly, the de-noising device 130 calculates a brightness ratio according to a reference brightness and the difference between the reference brightness and the pixel brightness of the pixel f(t). When the lighting becomes weaker, the noise becomes more. Therefore, when the pixel brightness is higher, the noise is less. Then the brightness ratio is set to lower by the de-noising device 130, to simulate the relationship between the lighting and the noise (step S610).

In the present disclosure, the pixel brightness, for example, is Y value (i.e., brightness value) of the YUV image format in the pixel f(t), and the reference brightness is 255, which uses the possible highest brightness as an example. The algorithm (2) of brightness ratio in this embodiment is below.

$$\text{brightness} = \frac{(\text{reference brightness} - \text{pixel brightness})}{\text{reference brightness}} \qquad \text{algorithm (2)}$$

For example, when the Y value of the pixel f(t) is 125, the brightness ratio=(255−125)/255=0.51. The pixel brightness can be calculated by the actual image format and the brightness ratio can be calculated by other methods. The present disclosure is not limited thereto.

After acquiring the brightness ratio (i.e., step S610), the de-noising device 130 calculates a distance ratio according to the position and the brightness ratio of the pixel f(t). As the distance between the position of the pixel f(t) and a center of the current frame Fr becomes further, the noise becomes more. Therefore, when the distance between position of the pixel f(t) and a center of the current frame Fr becomes further, the distance ratio is set to higher by the de-noising device 130, to simulate the relationship between the position of the pixel f(t) and the noise (step S620).

In the present disclosure, the distance ratio can be calculated by algorithms (3)-(5), as follows.

$$\text{dist ance ratio}=(1-\beta)\times\text{innerDistRate}+\beta\times\text{outerDistRate} \qquad \text{algorithm (3)}$$

$$\beta=(\text{dist}-\text{innerDist})/(\text{outerDist}-\text{innerDist}) \qquad \text{algorithm (4)}$$

$$\text{outerDistRate}=\text{innerDistRate}+(\text{brightness ratio}\times\text{maxRateAdjust}) \qquad \text{algorithm (5)}$$

"innerDistRate", "innerDist", "outerDist", and "maxRateAdjust" are external parameters. "dist" is the distance between position of the pixel f(t) and the center of the current frame Fr. Therefore, the distance ratio increases as "dist" goes on, thereby removing the amplified noise (because of the image gain) at the corner of the current frame Fr. The difference between "outerDistRate" and "innerDistRate" decreases as the brightness goes on, to avoid an afterimage easily occuring at the corner of the current frame Fr when the brightness ratio becomes higher.

Carrying on with the example above, the brightness ratio of the pixel f(t) is set to be 0.51. The position of the pixel f(t) is set to be (389, 209) and the position of the center is set to be (639, 359). innerDistRate, innerDist, outerDist, and maxRateAdjust is set to be 1.0, 359, 639, and 1.14 respectively. Therefore, outerDistRate=1.0+0.51*1.14=1.58. dist=|389−639|+|209−359|=400. β=(400−359)/(639−359)=0.15. The distance ratio=(1−0.15)*1.0+0.15*1.58=1.087. The distance ratio can be calculated by other methods, and should not be limited thereto.

After acquiring the distance ratio (step S620), the de-noising device 130 then generates a noise estimation value according to the brightness ratio, the distance ratio, and a noise parameter (step S630). In the present disclosure, the noise parameter can be calculated by algorithms (6), as follows.

$$\text{noise estimation value}=\text{noise parameter}\times\text{brightness ratio}\times\text{dista nce ratio} \qquad \text{algorithm(6)}$$

Carrying on with the example above, the noise parameter is constant and is set to be 5.0. Therefore, the noise estimation value=5.0*0.51*1.087=2.77. The noise estimation value can be calculated by other methods, and should not be limited thereto.

Next, the de-noising device 130 calculates the variance upper limit value D1 according to the noise estimation value and an upper limit parameter. The de-noising device 130 calculates the variance lower limit value D0 according to the noise estimation value and a lower limit parameter (step S640). In addition, the upper limit parameter is higher than the lower limit parameter, to ensure that it progressively increases from the variance lower limit value D0 to the variance upper limit value D1.

In the present disclosure, the variance upper limit value D1 can be calculated by algorithm (7) and the variance lower limit value D0 can be calculated by algorithm (8), wherein C1 is the upper limit parameter and C0 is the lower limit parameter.

$$D1=C1\times\text{noise estimation value} \qquad \text{algorithm (7)}$$

$$D0=C0\times\text{noise estimation value} \qquad \text{algorithm (8)}$$

Carrying on with the example above, the upper limit parameter C1 and the lower limit parameter C0 are constant and are set to be 3.04 and 1.04 respectively. Therefore, the variance upper limit value D1=3.04*2.77=8.42 and the variance lower limit value D0=1.04*2.77=2.88, as shown in FIG. 5. The variance upper limit value D1 and the variance lower limit value D0 can be calculated by other methods, and should not be limited thereto.

After setting the variance upper limit value D1, the variance lower limit value D0, the low-frequency upper limit value $R_{max}(t)$, and the low-frequency lower limit value $RL_{min}(t)$, the de-noising device 130 creates the low-frequency linear relationship between the variability DIF and the low-frequency learning rate RL(t), as shown in FIGS. 5A and 5B. The low-frequency linear relationship can be calculated by algorithm (9), as follows.

$$RL(t)=RL_{min}(t), DIF \leq D0$$

$$RL(t)=a \times DIF+b, D0 \leq DIF \leq D1$$

$$RL(t)=RL_{max}(t), DIF \leq D1 \quad \text{algorithm (9)}$$

where a and b are constant values calculated by linear equation according to the variance upper limit value D1, the variance lower limit value D0, the low-frequency upper limit value $R_{max}(t)$, and the low-frequency lower limit value $RL_{min}(t)$. The present disclosure is not limited thereto.

After creating the low-frequency linear relationship (i.e., step S410), the de-noising device 130 further calculates the variability DIF between the first low-frequency pixel $f_L(t)$ and the second low-frequency pixel $f_{Lavg}(t-1)$ (step S420). Next, the de-noising device 130 corresponds the variability DIF to one of the values of the low-frequency learning rate RL(t) as the first weight according to the low-frequency linear relationship (step S430). Next, the de-noising device 130 subtracts the first weight from 1, to generate the third weight (step S440).

After calculating the adjusted first weight and the adjusted third weight, the de-noising device 130 calculates the low-frequency pixel data $f_{Lavg}(t)$ by algorithm (1). Carrying on with the example above, the first low-frequency pixel $f_L(t)$ is set to be 107 and the second low-frequency pixel $f_{Lavg}(t-1)$ is set to be 104. Therefore, the variability DIF=$|f_L(t)-f_{Lavg}(t-1)|$=107−104=3. As shown in FIG. 5B, the low-frequency learning rate RL(t) corresponding to the variability DIF is 0.41, and is taken as the first weight. Then the de-noising device 130 calculates the third weight=(1−0.41). At present, the de-noising device 130 calculates the low-frequency pixel data $f_{Lavg}(t)$=0.41*107+(1−0.41)*104=105.23 by the algorithm (1), i.e., finishing step S330.

Please return to FIGS. 2-3. After finishing step S330, the de-noising device 130 adjusts the second weight and the fourth weight, and calculates the weighted sum of the first high-frequency pixel $f_H(t)$ and the second high-frequency pixel $f_{Havg}(t-1)$, to generate high-frequency pixel data $f_{Havg}(t)$. The sum of the second weight and the fourth weight is 1 (step S340). The aforementioned high-frequency pixel data $f_{Havg}(t)$ may be organized into the algorithm (10), as follows.

$$f_{Havg}(t)=W_H \times f_H(t)+(1-W_H) \times f_{Havg}(t-1) \quad \text{algorithm (10)}$$

$W_H$ is the second weight of the first high-frequency pixel $f_H(t)$, and $(1-W_H)$ is the fourth weight of the second high-frequency pixel $f_{Havg}(t-1)$.

Figure 7:
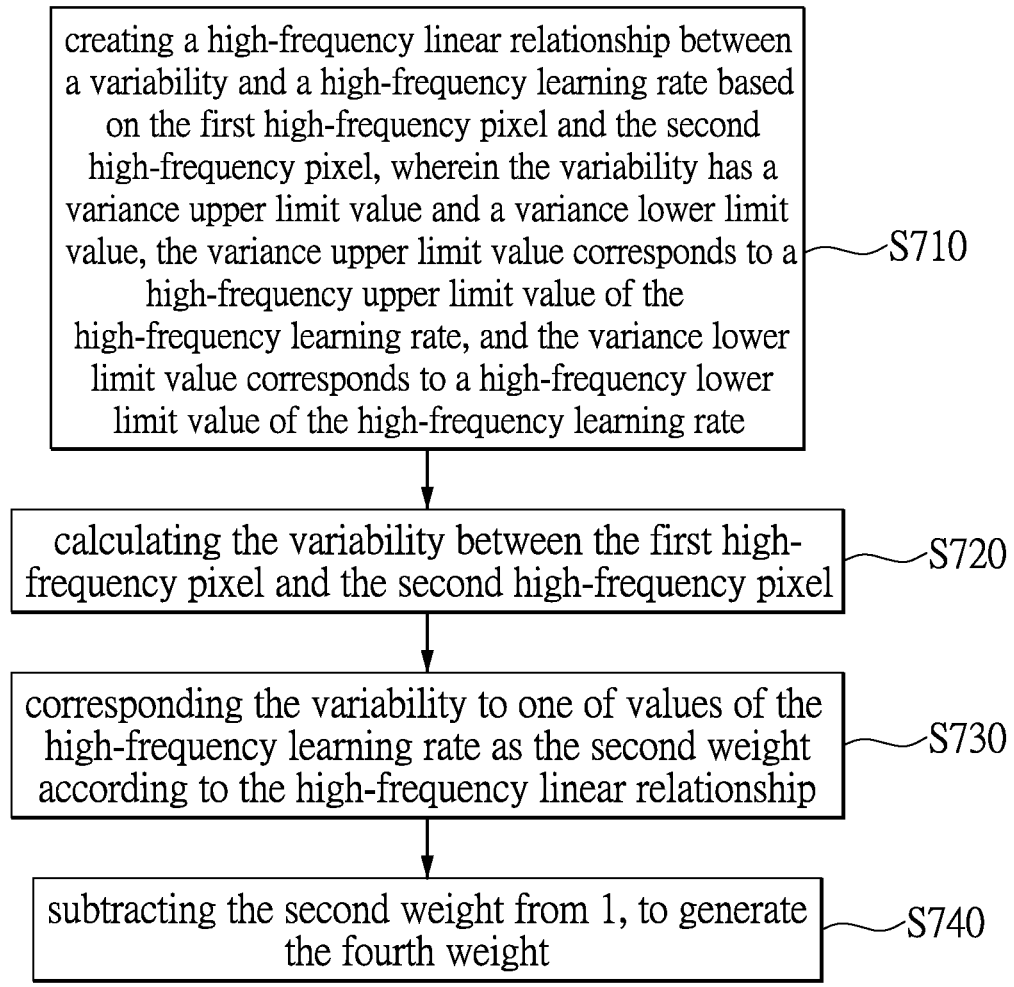
FIG. 7 shows a flowchart of adjusting a second weight and a fourth weight according to an exemplary embodiment of the present disclosure.
Figure 8A:
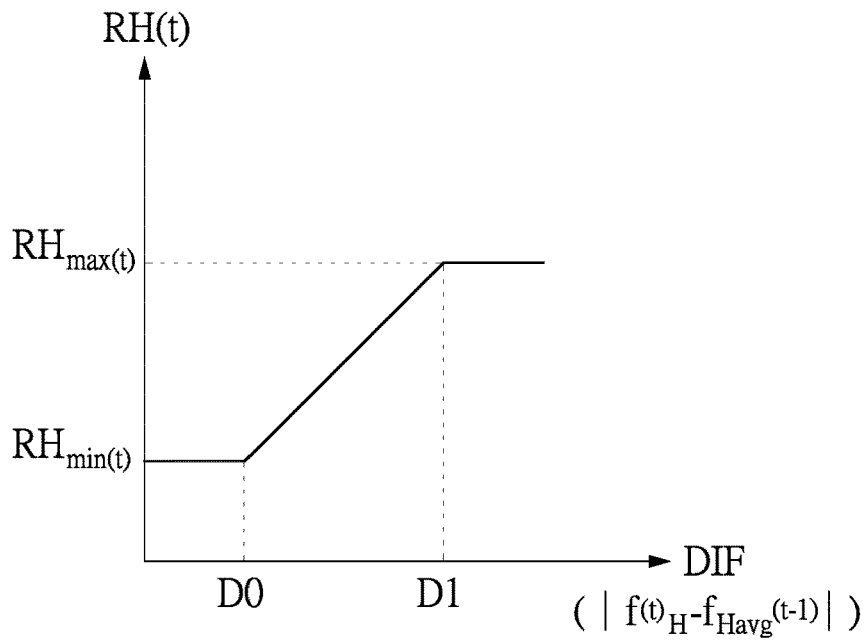
FIG. 8A shows a chart of a high-frequency linear relationship according to an exemplary embodiment of the present disclosure.
Figure 8B:
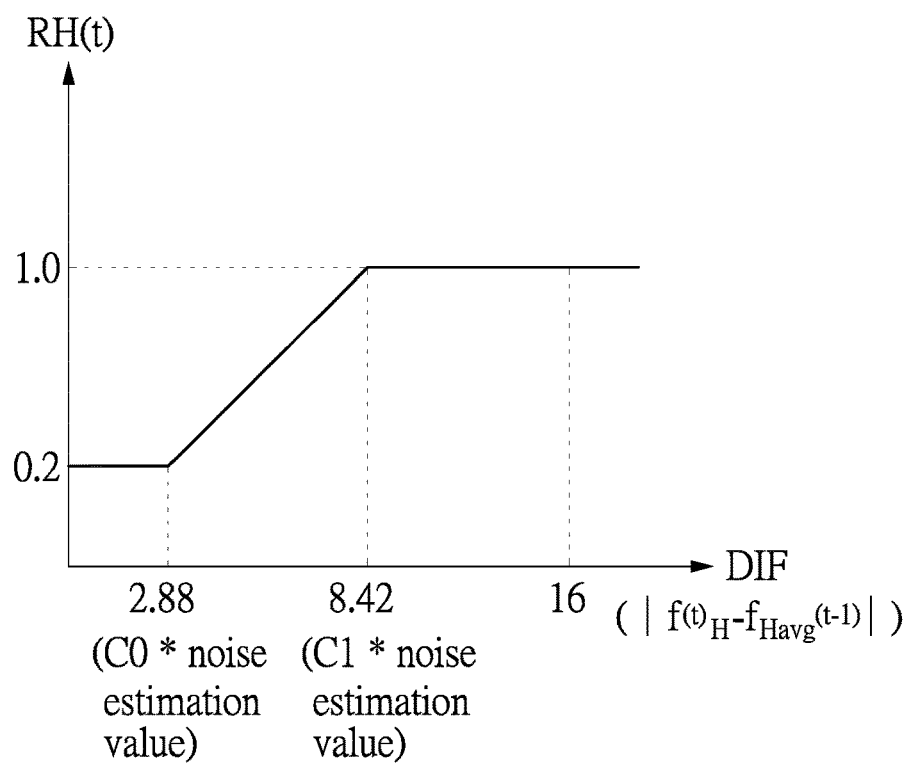
FIG. 8B shows a chart of a high-frequency linear relationship according to another exemplary embodiment of the present disclosure.

More specifically, the de-noising device 130 adjusts the second weight and the fourth weight according to the scene change (i.e., the difference between the previous frame and the current frame). The method of adjusting the second weight and the fourth weight is similar to the method of adjusting the first weight and the third weight (i.e., steps S410-S440 shown in FIG. 4). Therefore, steps S710-S740 can be inferred by steps S410-S440, so detailed description is omitted. As shown in FIGS. 7, 8A, and 8B, firstly, the de-noising device 130 creates a high-frequency linear relationship between a variability DIF and a high-frequency learning rate RH(t) based on the first high-frequency pixel $f_H(t)$ and the second high-frequency pixel $f_{Havg}(t-1)$, as shown in FIG. 8A (step S710). The variance upper value D1 limit corresponds to a high-frequency upper limit value $RH_{max}(t)$ of the high-frequency learning rate RH(t). The variance lower limit value D0 corresponds to a high-frequency lower limit value $RH_{min}(t)$ of the high-frequency learning rate RH(t).

In the present disclosure, the high-frequency upper limit value $RH_{max}(t)$ and the high-frequency lower limit value $RH_{min}(t)$ are constant and are set to be 1.0 and 0.2 respectively. The method of setting the variance upper limit value and the variance lower limit value can be inferred by steps S610-S640 shown in FIG. 6, so detailed description is omitted. Therefore, the variance upper limit value D1 is calculated to be 8.42 and the variance lower limit value D0 is calculated to be 2.88 according to steps of FIG. 6, as shown in FIG. 8B.

After setting the variance upper limit value D1, the variance lower limit value D0, the high-frequency upper limit value $RH_{max}(t)$, and the high-frequency lower limit value $RH_{min}(t)$, the de-noising device 130 creates the high-frequency linear relationship between the variability DIF and the high-frequency learning rate RH(t), as shown in FIGS. 8A and 8B. The high-frequency linear relationship can be calculated by algorithm (11), as follows.

$$RH(t)=RH_{min}(t), DIF \leq D0$$

$$RH(t)=a \times DIF+b, D0 \leq DIF \leq D1$$

$$RH(t)=RH_{max}(t), DIF \geq D1 \quad \text{algorithm (11)}$$

where a and b are constant values calculated by a linear equation according to the variance upper limit value D1, the variance lower limit value D0, the high-frequency upper limit value $RH_{max}(t)$, and the high-frequency lower limit value $RH_{min}(t)$. The present disclosure is not limited thereto.

After creating the high-frequency linear relationship (i.e., step S710), the de-noising device 130 further calculates the variability DIF between the first high-frequency pixel $f_H(t)$ and the second high-frequency pixel $f_{Havg}(t-1)$ (step S720). Next, the de-noising device 130 corresponds the variability DIF to one of the values of the high-frequency learning rate RH(t) as the second weight according to the high-frequency linear relationship (step S730). Next, the de-noising device 130 subtracts the second weight from 1, to generate the fourth weight (step S740).

After calculating the adjusted second weight and the adjusted fourth weight, the de-noising device 130 calculates the high-frequency pixel data $f_{Havg}(t)$ by algorithm (10). Carrying on with the example above, the first high-frequency pixel $f_H(t)$ is set to be 48 and the second high-frequency pixel $f_{Havg}(t-1)$ is set to be 32. Therefore, the variability DIF=$|f_H(t)-f_{Havg}(t-1)|$=48−32=16. As shown in FIG. 8B, the high-frequency learning rate RH(t) corresponding to the variability DIF is 1, and is taken as the second weight. Then the de-noising device 130 calculates the fourth weight=(1−1). At present, the de-noising device 130 calculates the high-frequency pixel data $f_{Havg}(t)=1*48+(1-1)*32=48$ by the algorithm (10), i.e., finishing step S730.

After acquiring the low-frequency pixel data $f_{Lavg}(t)$ and the H high-frequency pixel data $f_{Havg}(t)$, the de-noising device 130 calculates the sum of the low-frequency pixel data $f_{Lavg}$ and the high-frequency pixel data $f_{Havg}(t)$, to generate the output pixel $f_{avg}(t)$. The output pixel $f_{avg}(t)$ can be calculated by algorithm (12), as follows.

$$f_{avg}(t)=f_{Lavg}(t)+f_{Havg}(t) \qquad \text{algorithm (12)}$$

Carrying on with the example above, the low-frequency pixel data $f_{Lavg}(t)$ is calculated to be 105.23 and the high-frequency pixel data $f_{Havg}(t)$ is calculated to be 48. Therefore, the output pixel $f_{avg}(t)=105.23+48=153.23$. Accordingly, the de-noising device 130 adjusts the low-frequency pixel data $f_{Lavg}(t)$ and the high-frequency pixel data $f_{Havg}(t)$ according to the scene change, thereby removing the noise of the pixel f(t) in the current frame Fr. Then the de-noising device 130 outputs the de-noised output pixel $f_{avg}(t)$.

In summary, this embodiment provides an image de-noising method and an apparatus thereof, which categorize a pixel into a low-frequency pixel and a high-frequency pixel, and categorize a previous pixel corresponding to position of the pixel into another low-frequency pixel and another high-frequency pixel, to adaptively adjust the weight of the low-frequency pixel and the weight of the high-frequency pixel in the pixel and those in the previous pixel according to the scene change. Therefore, the image de-noising method and the apparatus thereof remove noise from each pixel of the current frame in sequence, and then output the de-noised pixel, thereby achieving a better effect of image de-noising.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. An image de-noising method, adapted for an image de-noising apparatus, used for removing noise of a pixel in a current frame to output an output pixel, and the image de-noising method comprising:
    receiving the current frame, and categorizing the pixel in the current frame into a first low-frequency pixel and a first high-frequency pixel, wherein the first low-frequency pixel has a first weight and the first high-frequency pixel has a second weight;
    categorizing a previous pixel corresponding to the position of the pixel in a previous frame into a second low-frequency pixel and a second high-frequency pixel, wherein the second low-frequency pixel has a third weight and the second high-frequency pixel has a fourth weight;
    adjusting the first weight and the third weight and calculating the weighted sum of the first low-frequency pixel and the second low-frequency pixel, to generate low-frequency pixel data, wherein the sum of the first weight and the third weight is one;
    adjusting the second weight and the fourth weight and calculating the weighted sum of the first high-frequency pixel and the second high-frequency pixel, to generate high-frequency pixel data, wherein the sum of the second weight and the fourth weight is one; and
    calculating the sum of the low-frequency pixel data and the high-frequency pixel data, to generate the output pixel.

2. The image de-noising method according to claim 1, wherein in the step of categorizing the pixel into the first low-frequency pixel and the first high-frequency pixel, further comprises:
    averaging the pixel and a plurality of adjacent pixels around the pixel, to generate the first low-frequency pixel; and
    subtracting the first low-frequency pixel from the pixel, to generate the first high-frequency pixel.

3. The image de-noising method according to claim 1, wherein in the step of categorizing the previous pixel into the second low-frequency pixel and the second high-frequency pixel, further comprises:
    averaging the previous pixel and a plurality of adjacent pixels around the previous pixel, to generate the second low-frequency pixel; and
    subtracting the second low-frequency pixel from the previous pixel, to generate the second high-frequency pixel.

4. The image de-noising method according to claim 1, wherein in the step of adjusting the first weight and the third weight, further comprises:
    creating a low-frequency linear relationship between a variability and a low-frequency learning rate based on the first low-frequency pixel and the second low-frequency pixel, wherein the variability has a variance upper limit value and a variance lower limit value, the variance upper limit value corresponds to a low-frequency upper limit value of the low-frequency learning rate, the variance lower limit value corresponds to a low-frequency lower limit value of the low-frequency learning rate, and the variance upper limit value and the variance lower limit value are relative to a pixel brightness of the pixel corresponding to the current frame and a position of the pixel located in the current frame;
    calculating the variability between the first low-frequency pixel and the second low-frequency pixel;
    corresponding the variability to one of the values of the low-frequency learning rate as the first weight according to the low-frequency linear relationship; and
    subtracting the first weight from 1, to generate the third weight.

5. The image de-noising method according to claim 1, wherein in the step of adjusting the second weight and the fourth weight, further comprises:
    creating a high-frequency linear relationship between a variability and a high-frequency learning rate based on the first high-frequency pixel and the second high-frequency pixel, wherein the variability has a variance upper limit value and a variance lower limit value, the variance upper limit value corresponds to a high-frequency upper limit value of the high-frequency learning rate, the variance lower limit value corresponds to a high-frequency lower limit value of the high-frequency learning rate, and the variance upper limit value and the variance lower limit value are relative to a pixel brightness of the pixel corresponding to the current frame and a position of the pixel located in the current frame;
    calculating the variability between the first high-frequency pixel and the second high-frequency pixel;
    corresponding the variability to one of the values of the high-frequency learning rate as the second weight according to the high-frequency linear relationship; and subtracting the second weight from 1, to generate the fourth weight.

6. The image de-noising method according to claim 4, wherein in the step of creating the variance upper limit value and the variance lower limit value, further comprises:
calculating a brightness ratio according to a reference brightness and the difference between the reference brightness and the pixel brightness, wherein the pixel brightness becomes higher, the brightness ratio becomes lower;
calculating a distance ratio according to the position and the brightness ratio of the pixel, wherein the distance between the position of the pixel and a center of the current frame becomes further, the distance ratio becomes higher;
generating a noise estimation value according to the brightness ratio, the distance ratio, and a noise parameter; and
calculating the variance upper limit value according to the noise estimation value and an upper limit parameter, and calculating the variance lower limit value according to the noise estimation value and a lower limit parameter, wherein the upper limit parameter is higher than the lower limit parameter.

7. The image de-noising method according to claim 5, wherein in the step of creating the variance upper limit value and the variance lower limit value, further comprises:
calculating a brightness ratio according to a reference brightness and the difference between the reference brightness and the pixel brightness, wherein as the pixel brightness becomes higher, the brightness ratio becomes lower;
calculating a distance ratio according to the position and the brightness ratio of the pixel, wherein as the distance between the position of the pixel and a center of the current frame becomes further, the distance ratio becomes higher;
generating a noise estimation value according to the brightness ratio, the distance ratio, and a noise parameter; and
calculating the variance upper limit value according to the noise estimation value and an upper limit parameter, and calculating the variance lower limit value according to the noise estimation value and a lower limit parameter, wherein the upper limit parameter is higher than the lower limit parameter.

8. An image de-noising apparatus, comprising:
an image capture device, configured for capturing an image and transforming the image into an image signal with a specific image format;
an image processor, coupled to the image capture device, configured for receiving the image signal, and transforming the image signal into a current frame; and
a de-noising device, coupled to the image processor, and configured to execute the following steps:
receiving the current frame, and categorizing the pixel in the current frame into a first low-frequency pixel and a first high-frequency pixel, wherein the first low-frequency pixel has a first weight and the first high-frequency pixel has a second weight;
categorizing a previous pixel corresponding to the position of the pixel in a previous frame into a second low-frequency pixel and a second high-frequency pixel, wherein the second low-frequency pixel has a third weight and the second high-frequency pixel has a fourth weight;
adjusting the first weight and the third weight and calculating the weighted sum of the first low-frequency pixel and the second low-frequency pixel, to generate low-frequency pixel data, wherein the sum of the first weight and the third weight is one;
adjusting the second weight and the fourth weight and calculating the weighted sum of the first high-frequency pixel and the second high-frequency pixel, to generate high-frequency pixel data, wherein the sum of the second weight and the fourth weight is one; and
calculating the sum of the low-frequency pixel data and the high-frequency pixel data, to output the de-noised pixel.

9. The image de-noising apparatus according to claim 8, wherein the de-noising device averages the pixel and a plurality of adjacent pixels around the pixel to generate the first low-frequency pixel, and subtracts the first low-frequency pixel from the pixel to generate the first high-frequency pixel.

10. The image de-noising apparatus according to claim 8, wherein the de-noising device averages the previous pixel and a plurality of adjacent pixels around the previous pixel to generate the second low-frequency pixel, and subtracts the second low-frequency pixel from the previous pixel to generate the second high-frequency pixel.

11. The image de-noising apparatus according to claim 8, wherein when the de-noising device adjusts the first weight and the third weight, the de-noising device creates a low-frequency linear relationship between a variability and a low-frequency learning rate based on the first low-frequency pixel and the second low-frequency pixel, calculates the variability between the first low-frequency pixel and the second low-frequency pixel, corresponds the variability to one of the values of the low-frequency learning rate as the first weight according to the low-frequency linear relationship, and subtracts the first weight from 1 to generate the third weight, wherein the variability has a variance upper limit value and a variance lower limit value, the variance upper limit value corresponds to a low-frequency upper limit value of the low-frequency learning rate, the variance lower limit value corresponds to a low-frequency lower limit value of the low-frequency learning rate, and the variance upper limit value and the variance lower limit value are relative to a pixel brightness of the pixel corresponding to the current frame and a position of the pixel located in the current frame.

12. The image de-noising apparatus according to claim 8, when the de-noising device adjusts the second weight and the fourth weight, the de-noising device creates a high-frequency linear relationship between a variability and a high-frequency learning rate based on the first high-frequency pixel and the second high-frequency pixel, calculates the variability between the first high-frequency pixel and the second high-frequency pixel, corresponds the variability to one of the values of the high-frequency learning rate as the second weight according to the high-frequency linear relationship, and subtracts the second weight from 1 to generate the fourth weight, wherein the variability has a variance upper limit value and a variance lower limit value, the variance upper limit value corresponds to a high-frequency upper limit value of the high-frequency learning rate, the variance lower limit value corresponds to a high-frequency lower limit value of the high-frequency learning rate, and the variance upper limit value and the variance lower limit value are relative to a pixel brightness of the pixel corresponding to the current frame and a position of the pixel located in the current frame.

13. The image de-noising apparatus according to claim 11, wherein when the de-noising device creates the variance upper limit value and the variance lower limit value, the de-noising device calculates a brightness ratio according to a reference brightness and the difference between the reference brightness and the pixel brightness, calculates a distance ratio according to the position and the brightness ratio of the pixel, generates a noise estimation value according to the brightness ratio, the distance ratio, and a noise parameter, calculates the variance upper limit value according to the noise estimation value and an upper limit parameter, and calculates the variance lower limit value according to the noise estimation value and a lower limit parameter, wherein as the pixel brightness becomes higher, the brightness ratio becomes lower, as the distance between the position of the pixel and a center of the current frame becomes further, the distance ratio becomes higher, and the upper limit parameter is higher than the lower limit parameter.

14. The image de-noising apparatus according to claim 12, wherein when the de-noising device creates the variance upper limit value and the variance lower limit value, the de-noising device calculates a brightness ratio according to a reference brightness and the difference between the reference brightness and the pixel brightness, calculates a distance ratio according to the position and the brightness ratio of the pixel, generates a noise estimation value according to the brightness ratio, the distance ratio, and a noise parameter, calculates the variance upper limit value according to the noise estimation value and an upper limit parameter, and calculates the variance lower limit value according to the noise estimation value and a lower limit parameter, wherein as the pixel brightness becomes higher, the brightness ratio becomes lower, as the distance between the position of the pixel and a center of the current frame becomes further, the distance ratio becomes higher, and the upper limit parameter is higher than the lower limit parameter.

* * * * *